United States Patent [19]
Kordesch et al.

[11] 3,883,368
[45] May 13, 1975

[54] ALKALINE ALUMINUM-AIR/ZINC-MANGANESE DIOXIDE HYBRID BATTERY

[75] Inventors: Karl V. Kordesch, Lakewood; Akiya Kozawa, Middleburg Heights, both of Ohio

[73] Assignee: Union Carbide Corporation, New York, N.Y.

[22] Filed: Oct. 26, 1972

[21] Appl. No.: 301,108

[52] U.S. Cl. ............................................. 136/86 A
[51] Int. Cl. ........................................... H01m 27/00
[58] Field of Search .................... 136/86 A, 86 S, 3

[56]  References Cited
UNITED STATES PATENTS
3,113,050  12/1963  Kordesch et al. ................... 136/123
3,531,327  9/1973   Moos ................................ 136/86 A

OTHER PUBLICATIONS

Society of Automotive Engineers, Jan. 11-15, 1971 (710237) pages 1-7.

*Primary Examiner*—John H. Mack
*Assistant Examiner*—H. A. Feeley
*Attorney, Agent, or Firm*—John R. Doherty

[57]  ABSTRACT

A hybrid battery is described. The battery comprises two different cells electrically connected in parallel, a first cell being an alkaline aluminum-air cell and the second cell being an alkaline zinc-manganese dioxide cell. The battery is particularly useful as a power source for electrically operated devices which require long periods of relatively low electrical current alternating with short periods of relatively high electrical current.

9 Claims, 3 Drawing Figures

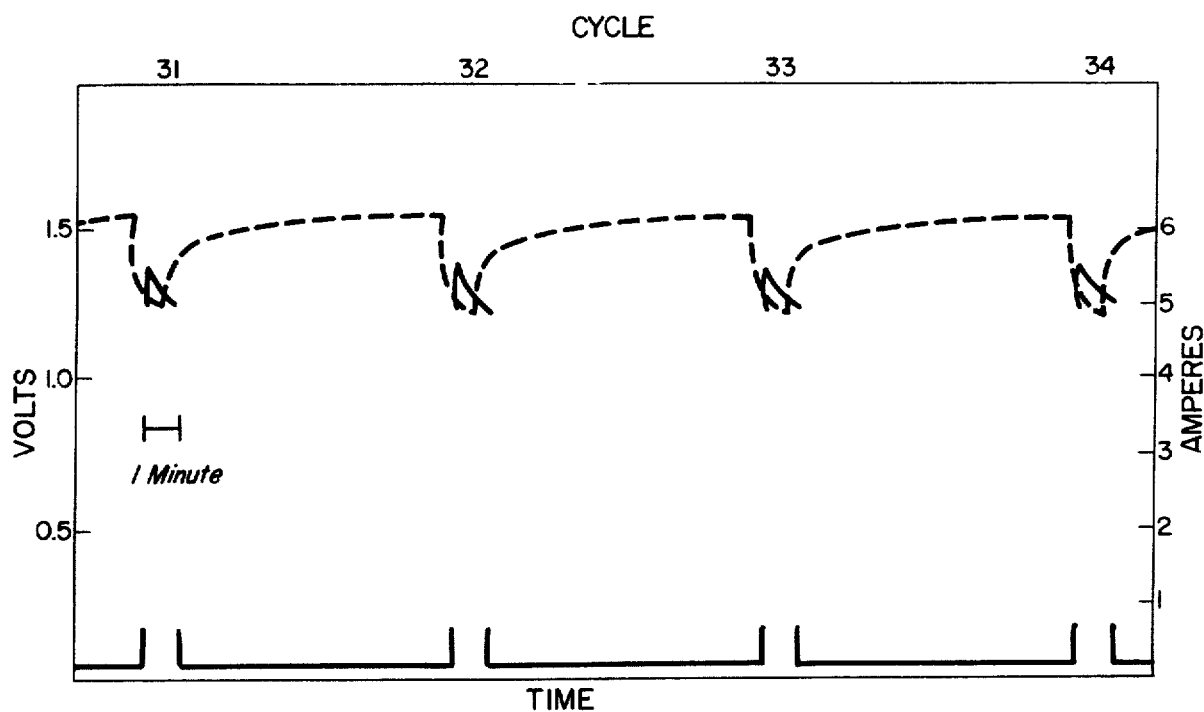
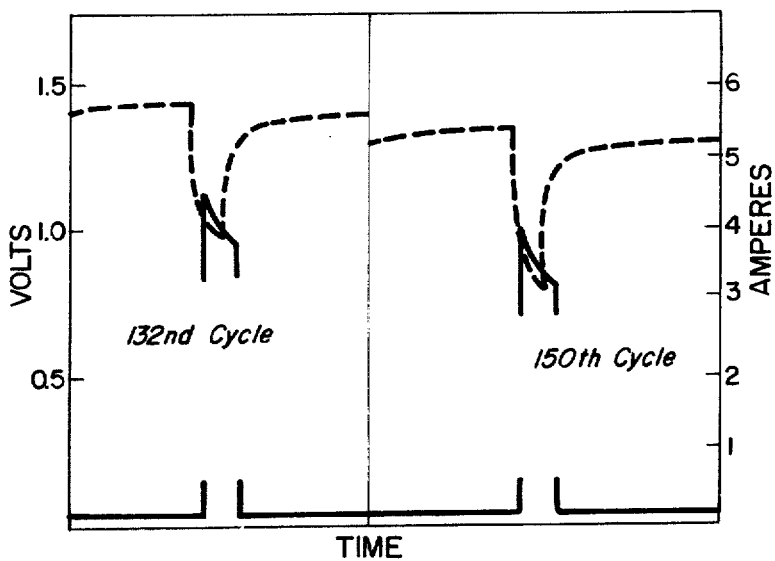
FIG. 3

ALKALINE ALUMINUM-AIR/ZINC-MANGANESE DIOXIDE HYBRID BATTERY

The invention relates to a hybrid alakaline aluminum-air/zinc-manganese dioxide battery.

Aluminum is unique in its high service capability to weight ratio, compared with other metallic electrode materials such as zinc and magnesium that are commonly used in aqueous electrolytes. An aluminum anode can theoretically deliver 3.03 ampere-hours (Ah) per gram via the following reaction:

$$Al \rightarrow Al^{+++} + 3e^-$$

This is 3.7 times the capacity of a zinc electrode (0.82 Ah/gram) and 1.4 times that of a magnesium electrode (2.2 Ah/gram).

Despite the high performance that can theoretically be obtained from galvanic cells employing aluminum electrodes, commercial acceptance of such cells has been limited. One of the characteristics of aluminum electrodes when used in alkaline cells is that there is a relatively narrow range of discharge current densities at the aluminum electrode under which the cell will operate efficiently. Current densities below this range result in excessive wasteful corrosion of the aluminum electrode, and current densities above this range cause excessive resistance (voltage drop) in the cell. As a result, the presently known alkaline aluminum-air cells can be used efficiently only in those end uses wherein there is likely to be encountered a relatively constant discharge current. In such uses, the aluminum electrode can be designed to have an available active surface area such that the current density during operation of the cell will fall within the above-discussed optimum range. However, in uses wherein the discharge current fluctuates over a wide range, there necessarily will be operating conditions under which the aluminum electrode is operating inefficiently, either owing to the voltage drop that occurs at high current densities, or the wasteful corrosion that occurs at low current densities.

The present invention is directed to the provision of a hybrid battery containing an alkaline aluminum-air cell, wherein said battery is designed to be used over a wide range of discharge currents, and wherein, at the same time, said alkaline aluminum-air cell is employed under efficient operating conditions.

It is a principal object of this invention to provide a hybrid battery utilizing an alkaline aluminum-air cell, wherein the battery can be operated efficiently over a wide range of discharge currents.

Another object of the invention is to provide a hybrid alkaline aluminum-air/zinc-manganese dioxide battery.

These and other objects of the invention are accomplished by the provision of a hybrid battery comprising two cells electrically connected in parallel, the first cell comprising an aluminum-air cell having an aqueous alkali electrolyte, and the second cell comprising a zinc-manganese dioxide cell having an aqueous alkali electrolyte. The hybrid battery of the invention is particularly well suited for uses wherein long periods of low discharge current alternate with short periods of high discharge current. The open circuit voltage of the aluminum-air alkaline cell, which is 1.65 to 1.70 volts, matches the trickle charge voltage requirement of the zinc-manganese dioxide alkaline cell. Therefore, when there is no external current drain on the hybrid battery, the aluminum-air cell charges the zinc-manganese dioxide cell. During low external discharge current drains on the battery, the voltage of the aluminum-air cell will still be high enough to maintain a slight charge current on the zinc-manganese dioxide cell. During operation under such low discharge currents, most of the electrochemical output of the battery is provided by the aluminum-air cell. However, when the current drain on the battery becomes sufficiently high that the working voltage of the aluminum-air cell drops below the nominal open circuit voltage of the zinc-manganese dioxide cell, the latter cell then begins to contribute to the current output of the battery. As was pointed out above, the working voltage on the aluminum-air cell will begin to drop when the current density at the aluminum electrode begins to exceed the optimum range. At high discharge currents, most of the electrochemical output of the battery comes from the zinc-manganese dioxide cell.

The principles of the invention will be described in detail hereinafter with reference to the accompanying drawings, wherein:

FIG. 3 is a series of graphs wherein voltage and amperage are plotted versus time, showing the performance of a hybrid battery of the invention alternating between long periods of low discharge current and short periods of high discharge current.

Figure 1:
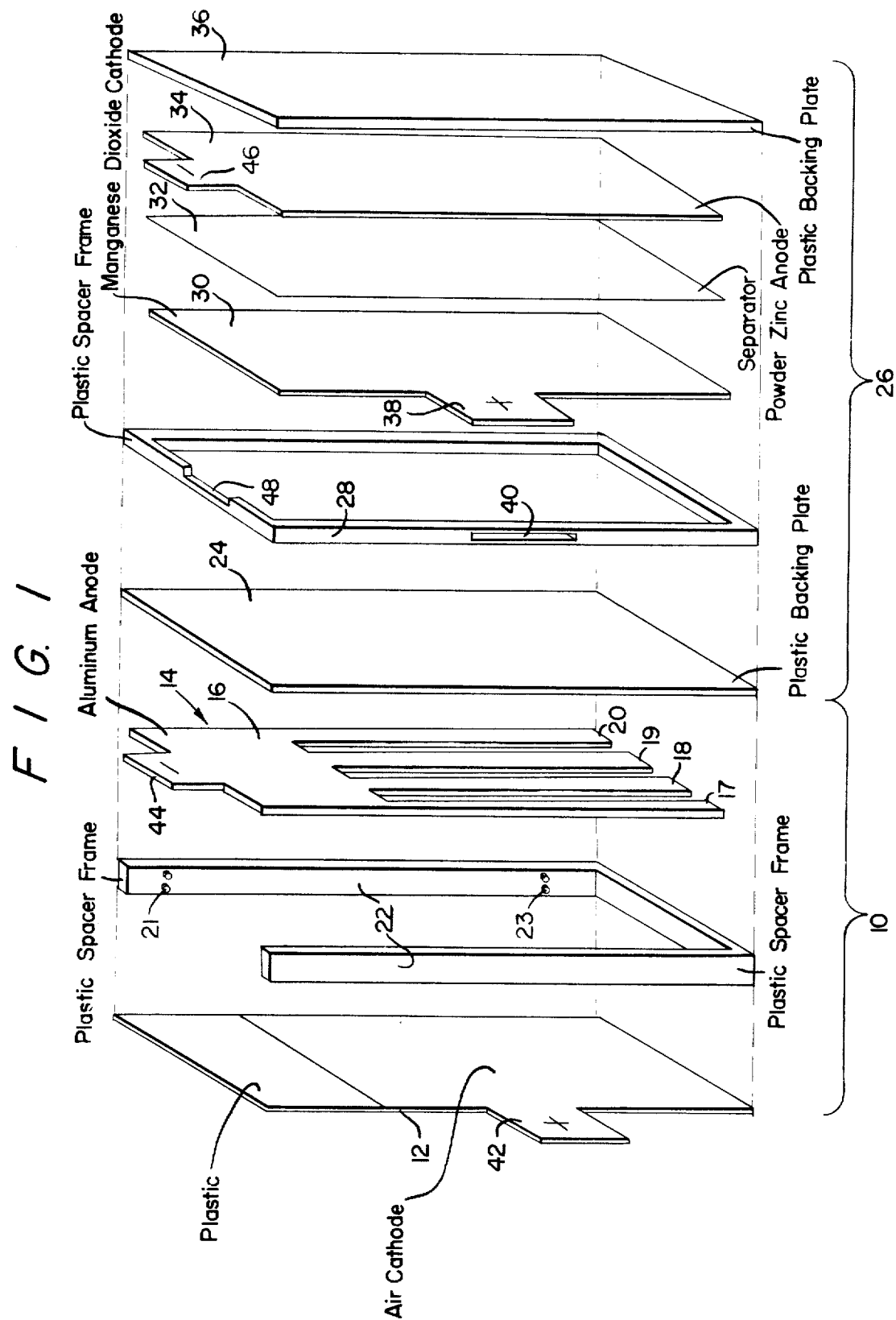
FIG. 1 is an exploded, perspective view of the elements of a hybrid battery embodying the principles of the invention.
Figure 2:
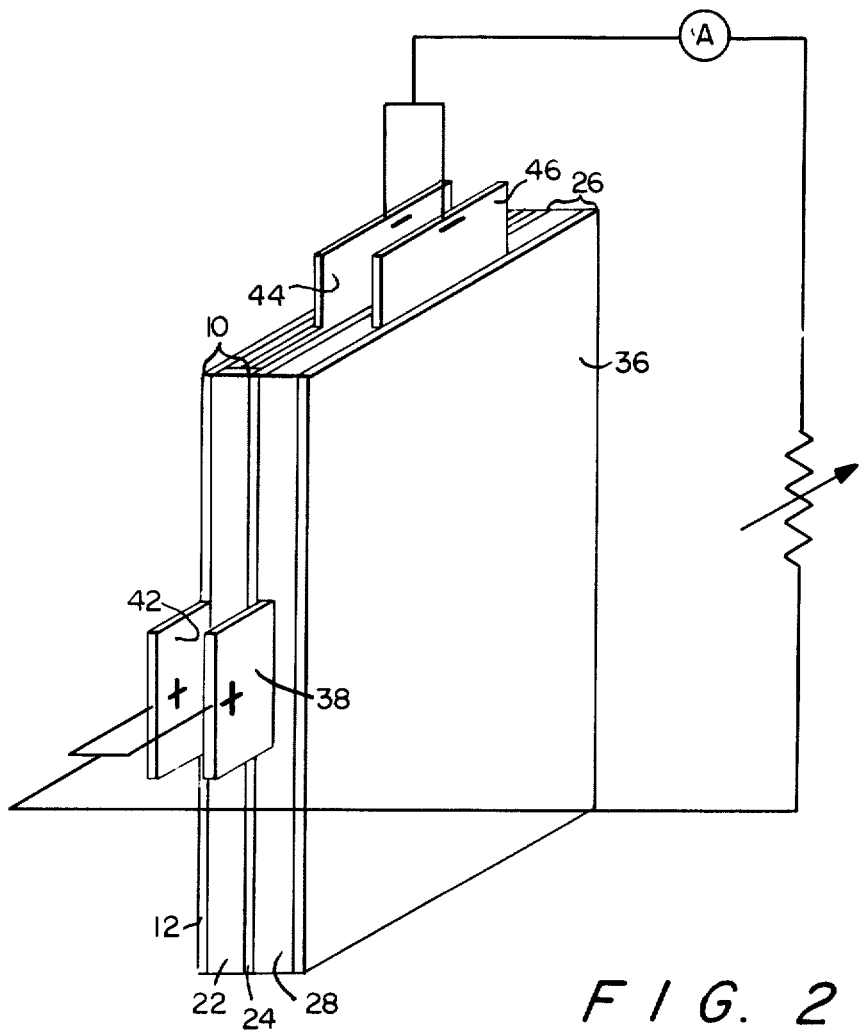
FIG. 2 is a perspective view of the same battery in assembled form.

Referring first of FIGS. 1 and 2, a hybrid battery embodying the principles of the invention is shown. The battery includes a first cell shown generally as 10, comprising an alkaline aluminum-air cell. This cell includes an air (i.e., oxygen-depolarized) cathode 12 and an aluminum anode 14. The aluminum anode 14 includes a solid upper portion 16 and depending FIGS. 17, 18, 19 and 20 formed by removing rectangular portions of the aluminum sheet from which the anode 14 is formed. The is done in order to reduce the effective surface area of the anode 14 so that the current density on the anode 14 will be within the optimum range discussed above. The air cathode 12 and the aluminum anode 14 are maintained in spaced relationship by a first plastic spacer frame 22. The aluminum anode 14 fits in this spacer frame 22 and is held there by sets of retaining guides 21 and 23. The aluminum anode 14 is backed up by a first plastic backing plate 24. This first cell 10 contains aqueous alkali electrolyte (not shown). Adjacent to the first cell 10 is a second cell, shown generally as 26, comprising a zinc-manganese dioxide alkaline cell. This second cell 26 includes a second plastic spacer frame 28, a thin, coherent, plastic bonded manganese dioxide cathode 30, a separator 32, a zinc powder anode 34 and a second plastic backing plate 36. The second cell 26 contains aqueous alkali electrolyte (not shown) absorbed in the separator 32. The manganese dioxide cathode 30, the separator 32, and the zinc anode 34 all fit inside the second plastic spacer frame 28. The cathode terminal 38 extends through the opening 40 in the frame 28, and the anode terminal 46 fits in the slot 48 at the top of the frame 28.

The battery is connected in parallel, that is, the air cathode terminal 42 and the manganese dioxide cathode terminal 38 are electrically connected together, and the aluminum anode terminal 44 and the zinc anode terminal 46 are electrically connected together.

The battery is assembled by gluing together the several plastic frames and plates. The several plastic backing plates and spacers are constructed of a material such as polymethyl methacrylate plastic that is resistant to the aqueous alkali electrolyte.

The first cell in the hybrid battery of the invention is an alkaline aluminum-air cell. The air electrode (i.e., an oxygen depolarized electrode) in this cell can be of a type that is known to the art, for instance, the air electrode can be a porous activated carbon plate, a phenolic resin-bonded carbon plate, or a thin, flat, plastic-bonded carbon plate of the fixed zone type as disclosed by Darland et al. in U. S. Pat. NO. 3,423,247. The air electrode can also be constructed of a sintered metal such as sintered nickel or silver. Customary air electrode catalysts can be used, such as $Al_2O_3\cdot CoO$ spinel, silver, noble metals, and ferric phthalocyanine. The preferred air electrode is a thin, flat, plastic bonded carbon electrode of the fixed zone type employing ferric phthalocyanine catalyst.

The electrolyte in the first cell is an aqueous alkaline solution, preferably of potassium hydroxide, although other alkali metal hydroxides such as sodium hydroxide can be used. Conventional concentrations in the electrolyte solution can be employed, for example, the alkali metal hydroxide can be present in the electrolyte in a concentration of from about 4N to about 9N. The preferred concentration is from about 5N to about 6N. The higher concentration ranges promote greater corrosion of the aluminum anode, but electrical conductivity is better and less total volume of electrolyte would be needed for a given capacity in this cell. For example, 9 N KOH would be more corrosive than 4 N KOH, but less total 9 N KOH would be needed.

The aluminum anode in the first cell is preferably made from high purity aluminum, such as aluminum of a purity in excess of 99.99 weight percent. Preferably, the active surface area of the aluminum anode is about ⅛ to ¼ of the nominal surface area of the air cathode. (The term "nominal surface area" refers to the geometric area of the air electrode without regard for the fact that its real surface area is vastly greater because of its porosity.) For example, if the air cathode is designed to deliver 10 milliampers per square centimeter, the aluminum anode is preferably designed to have a surface area such that it will operate at a current density of 40 to 80 milliampers per square centimeter. This current density range on the aluminum electrode will yield optimum efficiency with respect to the aluminum electrode when the aluminum-air cell is operated at about 35°C.

Preferably, the alkaline electrolyte in the first cell contains one or more additives designed to inhibit corrosion of the aluminum anode. Such additives include sodium stannate; a mixture of potassium citrate with either potassium stannate, lead acetate, or both; and a mixture of a sparingly soluble mercury compound such as mercuric oxide, or a mercury complex of limited dissociation such as potassium mercuric thiocyanate or potassium mercury iodide, with potassium zincate, potassium stannate, or both. The additives are employed in amounts effective to inhibit corrosion of the aluminum electrode when the battery is on open circuit or when the discharge current is so low that the current density of the aluminum electrode falls below the preferred range. Examples of preferred amounts of corrosion inhibitors are 0.5 to 2 weight per cent of potassium citrate, 0.5 to 2 weight per cent of potassium stannate, and 0.5 to 2 weight per cent lead acetate, all percentages being based on weight of the electrolyte. Examples of preferred concentration in the electrolyte of the mercury-zinc-tin system are from about 0.001M to about 0.003M of mercury (as mercury), from about 0.02M to about 0.1M of tin (as stannate), and from about 0.1M to about 0.3M of zinc (as zinc oxide).

The second cell in the hybrid battery of the invention is a zinc-manganese dioxide alkaline cell. The zinc anode in the second cell can be any standard type of zinc anode such as a pressed powder zinc anode, a gelled zinc powder anode, or a zinc plate. The electrolyte in the second cell is an aqueous alkaline solution, preferably aqueous potassium hydroxide, although other alkali metal hydroxides such as sodium hydroxide can be used. The alkali metal hydroxide will normally be in a concentration of from about 4N to about 12N, and preferably from about 5N to about 9N.

While any standard type of manganese dioxide electrode can be used in the second cell, an important and essential feature of the preferred hybrid battery of the invention is the use of a thin, coherent, plastic bonded manganese dioxide electrode in the second cell. These thin, coherent, plastic-bonded manganese dioxide electrodes are described in applicants' U.S. Pat. application "Coherent Manganese Dioxide Electrodes, Process For Their Production, And Electrochemical Cells Utilizing Them" Ser. No. 212,908, filed Dec. 28, 1971, the disclosure of which is incorporated herein by reference. As used herein, a "thin, coherent, plastic-bonded, manganese dioxide electrode" is an electrode that is composed of (a) particulate manganese dioxide, (b) colloidal electrically conductive material, and (c) particulate electrically conductive material, said materials (a), (b) and (c) being bonded by an electrolyte-wettable but insoluble polymeric binder, and said colloidal electrically conductive material providing particle-to-particle electrical contact within the electrode. The electrodes are characterized by resistance to swelling in aqueous electrolytes.

Examples of colloidal electrically conductive materials that can be employed in the thin, coherent, plastic-bonded manganese dioxide electrodes include colloidal graphite, colloidal carbon black, and colloidal metal powders such as silver and nickel. The preferred colloidal electrically conductive material is graphite. The particle electrically conductive material that is employed in the manganese dioxide electrode includes materials that are customarily employed in manganese dioxide depolarizer mixes such as acetylene black and powdered graphite.

The polymer binder that is employed in the manganese dioxide electrode is one that, in its ultimate form in the finished electrode, will permit the electrode to be wetted by the electrolyte to be used in the cell, but at the same time, the electrode will be resistant to swelling by the electrolyte. The term "wetted" refers to a surface condition in which the electrolyte is permitted to penetrate the pores of the electrode to achieve maximum ionic contact between the electrolyte and the active material in the electrode. Preferred polymeric binders include polymethyl methacrylate, polysulfone, and epoxy resins.

The thin, coherent, plastic-bonded manganese dioxide electrodes are made by a process which comprises first mixing the polymeric binder, the colloidal electrically conductive material, the particulate manganese dioxide, and the particulate electrically conductive material, to produce a mixture, which is then formed into a coherent electrode, as by pressing in a press under moderate pressure. Preferably, the polymeric binder and the colloidal electrically conductive material are mixed first, prior to mixing with the particulate electrically conductive material and the particulate manganese dioxide. Also, it is preferred to employ a nonreactive liquid in producing the electrode mixture. Such liquid will normally be either a solvent or a good dispersant for the polymeric binder. Useful liquids include volatile (i.e., capable of rapid and essentially complete volatilization at temperatures not higher than about 100°C.) materials such as chlorinated hydrocarbons, for example methylene dichloride, chloroform, dichloroethylene, perchloroethylene, and other materials such as tetrahydrofuran, isopropyl alcohol, tertiary butyl alcohol, and ketones such as acetone, methyl ethyl ketone, and methyl isobutyl ketone. The chlorinated hydrocarbons are the preferred volatile liquids.

The thin, coherent, plastic-bonded manganese dioxide electrodes that are employed in the invention are capable of relatively high rates of discharge. They will normally have a thickness of from about 10 to about 50 mils.

The hybrid battery of the invention is particularly suitable for use in utilities wherein two or more known external discharge current rates are required, one current rate being low and the other being high relative to each other. In designing the battery for such use, the active surface area of the aluminum electrode is preferably such that the current density at the aluminum electrode is within the preferred range of from about 40 to 80 milliamperes per square centimeter at a discharge current rate that is the average current rate of the said low rate and the said high rate. The reason for this is that during the period when the battery is discharging at the low current rate, the aluminum-air cell is also charging the zinc-manganese dioxide cell. Therefore, during this charging period the current provided by the aluminum-air cell is greater than the external discharge current on the battery. As used herein, the term "average current rate" refers to the total ampere-hours of current delivered by the battery divided by the time the battery is in operation. Because the aluminum-air cell actually provides most of the energy output of the battery, it should be designed to have a capacity sufficient to meet most of the energy requirements of the battery. In this connection, about two ampere-hours of output energy will be obtained per gram of aluminum at about 60 per cent current efficiency in operation (theoretical = 3.03 ampere-hours per gram). Approximately two milliliters of 4N to 6N aqueous KOH are required for each ampere-hour of output, unless some means of electrolyte regeneration and circulation (or replacement) are employed.

The hybrid battery of the invention is particularly useful for applications such as power supplies for field radios wherein long periods of relatively low discharge currents (receiving) alternate with short periods of relatively high discharge currents (transmitting). The electrochemical device of the invention may also be employed as a means for maintaining a full charge on any secondary zinc-manganese dioxide alkaline cell, provided that the aluminum-air cell has sufficient capacity.

The invention is further illustrated by the examples set forth below.

EXAMPLE 1

A hybrid batttery of the type generally illustrated in FIGS. 1 and 2 was constructed and used to obtain the data shown in FIG. 3.

The aluminum anode was 4 inches × 2-¼ inches × 0.020 inch in dimension and had the solid portion at its top (about 1 inch) and the back portion which faced away from the cathode masked off from electrolyte contact by epoxy resin, leaving only one face of the depending aluminum fingers exposed to the electrolyte. The area of aluminum electrode in contact with the electrolyte was about 11 square centimeters. About 20 grams of aluminum were available for electrochemical use. A thin, plastic bonded "fixed-zone" carbon air electrode, 2-¼ inches × 3 inches × 0.020 inch in size, was employed as the cathode, and was mechanically separated from the aluminum electrode by a polymethyl methacrylate spacer frame so that the compartment thus formed between the two electrodes could be filled with about 60 milliliters of 5N to 6N aqueous potassium hydroxide solution. This portion of the hybrid battey was completed by a polymethyl methacrylate backing plate (about 0.010 - 0.020 inch thick).

A thin, coherent, plastic-bonded (polymethyl methacrylate) manganese dioxide electrode (5 inches × 2-¼ inches × 0.020 inch in size) was placed adjacent to the first plastic backing plate with a second plastic spacer frame. A thin cellulosic separator containing absorbed 5N to 6N aqueous potassium hydroxide and a thin zinc anode made of zinc powder (about 6 grams) bonded onto a metal screen collector with carboxymethyl cellulose-KOH gel completed the alkaline zinc-manganese dioxide cell, which had a capacity of about 3 ampere hours. The second plastic backing plate was put in place, and the entire plastic frame and cover plate assembly was sealed, leaving the gas side of the carbon air cathode exposed to the air on one side, and the electrode terminals exposed as shown in FIGS. 1 and 2. The two external negative terminals were connected to each other and the same was done for the two external positive terminals. The thickness of the alkaline zinc-manganese dioxide cell was ⅛ inch and that of the aluminum-air cell was ½ inch, giving a total hybride battery thickness of ⅝ inch (outside battery dimensions: 5 inches × 2-½ inches × ⅝ inch).

EXAMPLE 2

The hybrid battery described above was evaluated by placing it under a series of load cycles consisting of a constant current drain of 0.125 ampere for 9 minutes followed by a 5 ampere current drain for 1 minute. FIG. 3 shows the hybrid battery performance during the 31st through the 34th, the 132nd and the 150th cycles.

The current profile, illustrated by the solid lines, shows that the low current (0.125 ampere) was consistently delivered for a 9-minute period throughout the 150 cycles shown in FIG. 3. The peak current (5 amperes) was delivered successfully for a 1-minute period through the 34th cycle but had dropped somewhat by the 132nd cycle and fell to 3-4 amperes on the 150th cycle.

The voltage profile, illustrated by the broken lines, shows that the hybrid battery voltage was about 1.5 volts on the 0.125-ampere load and dropped to about 1.25 volts during the peak load periods. After each peak load period, the battery voltage again rose to about 1.5 volts through the 34th cycle. (The gradual increase in voltage up to 1.5 volts indicates charge current flowing from the alkaline aluminum-air cell to the alkaline zinc-manganese dioxide cell during this period). By the 132nd cycle, the voltage was slightly less than 1.5 volts on the low current drain. By the 150th cycle, the voltage on the peak current drain had dropped below the designated voltage cutoff of 1.0 volt and the test was terminated.

The data in FIG. 3 demonstrates that the hybrid battery is capable of performing successfully on the 9-minute-0.125 A, 1-minute-5 A discharge for up to 150 cycles.

The average discharge current rate of the battery was about 0.6 ampere, calculated as follows: 6 one-minute 5-ampere pulses per hour equals 30 ampere-minutes per hour, plus 54 minutes at 0.125 ampere equals 6.75 ampere-minutes, yields a total of 36.75 ampere-minutes per hour. Dividing 36.75 ampere-minutes by 60 minutes yields an average discharge current rate of 0.61 ampere. Since the active surface area of the aluminum electrode is about 11 square centimeters, the current density on the aluminum electrode at the average discharge current rate is about 55 milliamperes per square centimeter.

What is claimed is;

1. A hybrid battery capable of discharging at two or more current rates, one rate being high and the other being low relative to each other, said battery comprising a first and a second cell electrically connected in parallel, the open circuit voltage of said first cell being substantially equal to the trickle charge voltage requirement of said second cell, said first cell having an aluminum electrode, an oxygen depolarized electrode, and an aqueous alkaline electrolyte, said aluminum electrode having a surface area such that the current density at said aluminum electrode at a current rate equal to the average current rate of said relatively high rate and said relatively low rate is sufficient to enable said first cell to be discharged without excessive wasteful corrosion of said aluminum electrode normally occurring at low current densities and without an excessive voltage drop in said first cell normally occuring at high current densities and said second cell having a zinc electrode, a manganese dioxide electrode, and an aqueous alkaline electrolyte, wherein said battery is so constructed and arranged that said first cell delivers most of the electrochemical output of the battery when the external discharge current rate on the battery is said relatively low rate, said second cell delivers most of the electrochemical output of the battery when the external discharge current rate on the battery is said relatively high rate, and said first cell charges said second cell when there is no external discharge current on said battery.

2. The hybrid battery of claim 1 wherein the manganese dioxide electrode is a thin, coherent, plastic-bonded electrode comprising (a) particulate manganese dioxide, (b) colloidal electrically conductive material, and (c) particulate electrically conductive material, said materials (a), (b) and (c) being bonded by an electrolyte-wettable but insoluble polymeric binder, and said colloidal electrically conductive material providing particle-to-particle electrical contact within said manganese dioxide electrode.

3. A hybrid battery capable of discharging at two or more current rates, one rate being high and the other being low relative to each other, said battery comprising a first and a second cell electrically connected in parallel, the open circuit voltage of said first cell being substantially equal to the trickle charge voltage requirement of said second cell, said first cell having an aluminum electrode, an oxygen depolarized electrode, and an aqueous alkaline electrolyte, said aluminum electrode having a surface area such that the current density at said aluminum electrode is within the range of from about 40 to about 80 milliamperes per square centimeter at a discharge current rate substantially equal to the average current rate of said relatively low rate and said relatively high rate, and said second cell having a zinc electrode, a manganese dioxide electrode and an aqueous alkaline electrolyte, wherein said battery is so constructed and arranged that said first cell delivers mot of the electrochemical output of the battery when the external discharge current rate on the battery is said relatively low rate, said second cell delivers most of the electrochemical output of the battery when the external discharge current rate on the battery is said relatively high rate, and said first cell charges said second cell when there is no external discharge current on said battery.

4. The hybrid battery of claim 3 wherein the active surface area of the aluminum electrode is from about one-eighth to about one-fourth the nominal surface area of the oxygen depolarized electrode.

5. The hybrid battery of claim 3 wherein the aqueous alkaline electrolyte in both of said cells is aqueous potassium hydroxide.

6. The hybrid battery of claim 3 wherein the aqueous alkaline electrolyte of said first cell contains sodium stannate in an amount effective to inhibit corrosion of said aluminum electrode.

7. The hybrid battery of claim 3 wherein the aqueous alkaline electrolyte of said first cell contains potassium citrate and at least one compound selected from the group consisting of potassium stannate and lead acetate, in an amount effective to inhibit corrosion of said aluminum electrode.

8. The hybrid battery of claim 3 wherein the aqueous alkaline electrolyte of said first cell contains a sparingly soluble mercury compound and at least one compound selected from the group consisting of potassium zincate and and potassium stannate, in an amount effective to inhibit corrosion of said aluminum electrode.

9. The hybrid battery of claim 3 wherein the aqueous alkaline electrolyte of said first cell contains a mercury complex of limited dissociation and at least one compound selected from the group consisting of potassium zincate and potassium stannate, in an amount effective to inhibit corrosion of said aluminum electrode.

* * * * *